United States Patent [19]

Baruch

[11] Patent Number: 4,765,362

[45] Date of Patent: Aug. 23, 1988

[54] ANTI-THEFT SYSTEM FOR VEHICLES

[76] Inventor: Yehuda Baruch, 12, Kaplansky Street, Rishon Le'Zion, Israel

[21] Appl. No.: 31,945

[22] Filed: Mar. 27, 1987

[30] Foreign Application Priority Data

Apr. 2, 1986 [IL] Israel ........................................ 78404
Feb. 17, 1987 [IL] Israel ........................................ 81600

[51] Int. Cl.$^4$ ............................................ F16K 35/00
[52] U.S. Cl. .................. 137/384.2; 137/385; 70/176; 70/237
[58] Field of Search ............... 137/385, 384.2; 303/89; 188/353; 70/176, 177, 178, 237

[56] References Cited

U.S. PATENT DOCUMENTS

| | | | |
|---|---|---|---|
| 3,401,545 | 9/1968 | Fraser | 70/179 |
| 3,557,584 | 1/1971 | Triglia | 70/237 |
| 4,402,339 | 9/1983 | Owens | 70/176 |
| 4,633,686 | 1/1987 | Carr | 70/237 |
| 4,658,608 | 4/1987 | Fox | 70/179 |

FOREIGN PATENT DOCUMENTS 1580183 11/1980 United Kingdom ............. 137/384.2

Primary Examiner—A. Michael Chambers
Attorney, Agent, or Firm—Torn, McGeady & Associates

[57] ABSTRACT

A system for installation in mechanized vehicles which have an hydraulic brake system prevents the unauthorized operation of such vehicles and includes a valve of a special construction which comprises a housing provided with inlet ports and outlet ports for the hydraulic fluid, and an inner core member which is movable within the housing and is provided with bores which correspond with the ports in the housing forming a passage. Further, the valve includes at least one by-pass passage provided with a one way valve, the inner core member is movable rotatively or axially within the housing, and is connected to a key operated lock.

8 Claims, 4 Drawing Sheets

ANTI-THEFT SYSTEM FOR VEHICLES

FIELD OF INVENTION

The present invention relates to an anti-theft system for vehicles which is operated; by the use of specially constructed valves which are provided with an inner one way passage.

The theft of vehicles in general and of automobiles in particular is an ever growing problem now-a-days. Whatever the motives for stealing an automobile are, the damage to the car and its owner is large.

There are known a great number of anti-theft systems and devices, some of which are incorporated in the vehicle at the time of manufacture and some subsequently.

The systems and devices are of two kinds mainly, one kind in which the movement of parts is mechanically blocked such as steering wheel, gear lever, brake and-/or clutch pedals etc. The second kind comprises electrical alarm systems and/or systems which incapacitate the electrical system of the vehicle.

Experience has shown that car thieves learn very quickly how to handle and tamper with the many various systems. There is, therefore, a need for new systems which will replace or be added to the existing systems.

OBJECTS OF INVENTION

It is, therefore, the object of the present invention to provide a system which will prevent or diminish the possibility of any theft.

Another object of the present invention is to provide a system which can be added to existing systems.

It is yet a further object of the present invention to provide a system which will immobilize or neutralise one or more of the existing hydraulic systems of the vehicle.

SHORT SUMMARY OF DISCLOSURE

The present invention resides in the blocking of the hydraulic systems of the vehicle, namely, the braking system and in some vehicles the steering system by means of mechanical means, thus preventing the use of either both the steering and or the vehicle's brakes.

There is known an anti-theft apparatus which blocks the vehicle's brakes by means of a sophisticated electronic device. The present invention relates to a mechanical device of simple and inexpensive construction which is operated by a key.

According to the present invention, a valve of a special construction which comprises a housing is provided with at least two inlet ports and two outlet ports for the hydraulic fluid and an inner core member provided with bores which correspond with bores in said housing forming a passage, and to which are connected hydraulic fluid pipes, said valve further comprises at least one by-pass passage provided with a one way valve, said inner member further comprises an extension provided with two bores perpendicular to each other, said inner member being connected to a key operated lock.

In a preferred embodiment of the invention the valve, the two parts of the inner member are distinct from one another and being provided with an inner one way passage and operated by two different keys.

SHORT DESCRIPTION OF DRAWINGS

The invention will now be described with reference to the annexed drawings in which:

FIG. 2 illustrates a combined valve for two hydraulic systems, while

FIGS. 3 and 4 illustrate embodiments of the valve, with separate inner members, while

DETAILED DESCRIPTION OF PREFERRED EMBODIMENT

Figure 1:
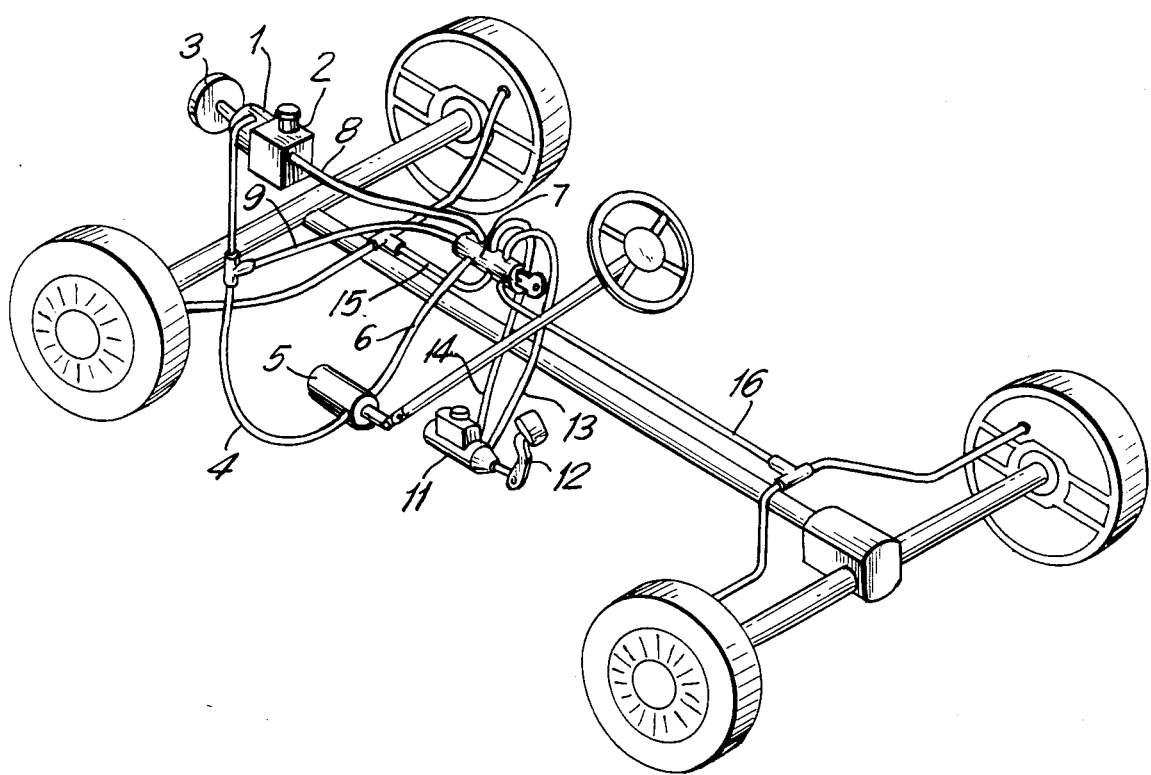
FIG. 1 is a schematic illustration of the hydraulic systems of a vehicle.

Turning first to FIG. 1 which illustrates two hydraulic systems of a vehicle, one which operates the steering and the second which operates the brakes. The first system comprises a pump 1, an hydraulic fluid tank 2, the pump being operated by the vehicle's engine via a pulley 3; a feeding conduit 4 connects the steering box and selector 5 with pump 1, from said selector a conduit 6 is connected to the new valve 7, conduit 8 connects the valve with tank 2 while conduit 9 connects the valve with conduit 4.

The braking system comprises a pump 11 which is operated by pedal 12, two feeding conduits 13 and 14 are connected with said new valve 7 from which two conduits 15 and 16 lead to the vehicle's front and rear wheels.

Figure 2:
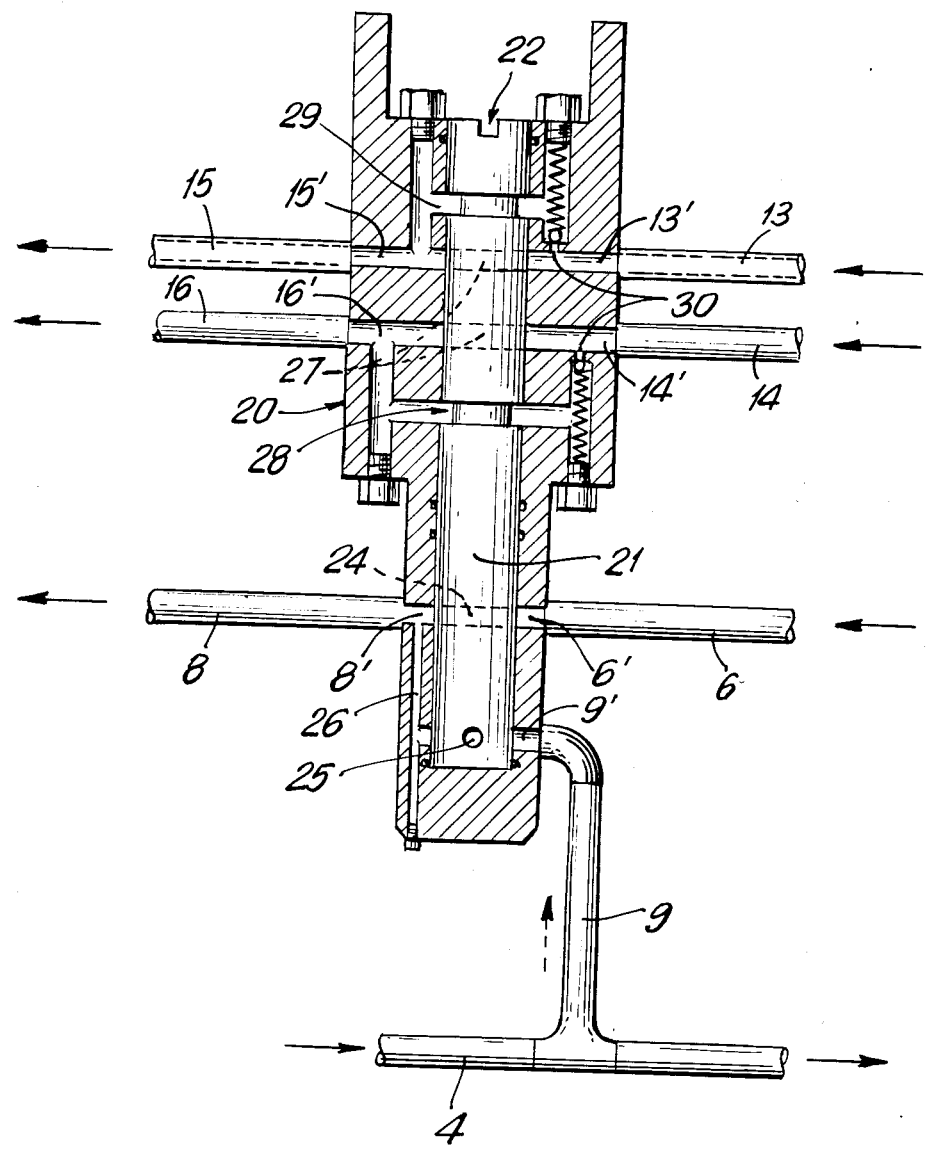

Turning now to FIG. 2 the new valve 7 consists of a housing 20 and an inner core 21 which is operated by a key at 22. Said housing 20 is provided with inlet 6' and outlets 8' and 9' for the hydraulic fluid of the steering means and inlets 13', 14' and outlets 15', 16' for the hydraulic fluid of the braking system.

The valve further comprises elements to which reference will be made henceforth.

The new valve which is shown in the normal working position functions in the following manner:

The hydraulic fluid of the steering system is under constant pressure of pump 1 which is driven by pulley 3 (said pulley is driven by means of the fan belt of the engine, not shown). The fluid is driven through conduit 4 into selector 5 and via conduit 6 to new valve 7 and back into the hydraulic fluid tank 2 via conduit 8. Intermediate conduits 6 and 8 are positioned in the new valve. Said conduits 6 and 8 are connected to inlets 6' and 8' respectively of housing 20. The fluid enters the housing via inlet 6' and passes through bore 24 which is provided within inner core 21 and out via outlet 8'. By turning the inner core through 90° by means of a key, the passage of the fluid through bore 24 will be closed thus immobilizing the steering wheel. As the pump is activated by the engine the fluid is diverted into a branch of conduit 9 and into inlet 9' through bore 25 which is perpendicular to bore 24—into passage 26 to outlet 8' back into tank 2, i.e. a closed cycle of the fluid which does not reach the steering box mechanism.

Turning now to the braking system, the brake pump 11 is activated by pedal 12. Said pump usually activates two separate braking systems for security reasons. The new valve is positioned intermediate the pump and the vehicle brakes. The two conduits 13, 14 are connected to inlets 13' and 14' as can be seen in FIG. 2 two bores 27 are in line with outlets 15' and 16' so as the braking fluid passes there through where the pump is activated.

As described before when the inner core is turned through 90° and passage is closed.

Once the brakes are activated the braking fluid is diverted to the by-passes 28, 29 and the pressure is applied on the brakes. The release of the pedal usually results in the back flow of the fluid into the pump but as the passage 27 is closed and the by-passes 28 and 29 are provided with a one way valve 30 the flow back is not possible thus the brakes remain in the braking position, practically immobilizing the vehicle.

Figure 3:
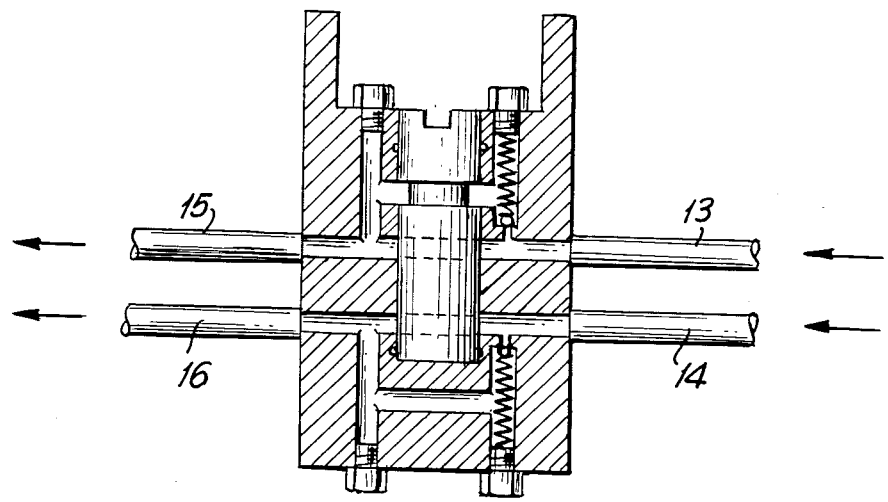
Figure 4:
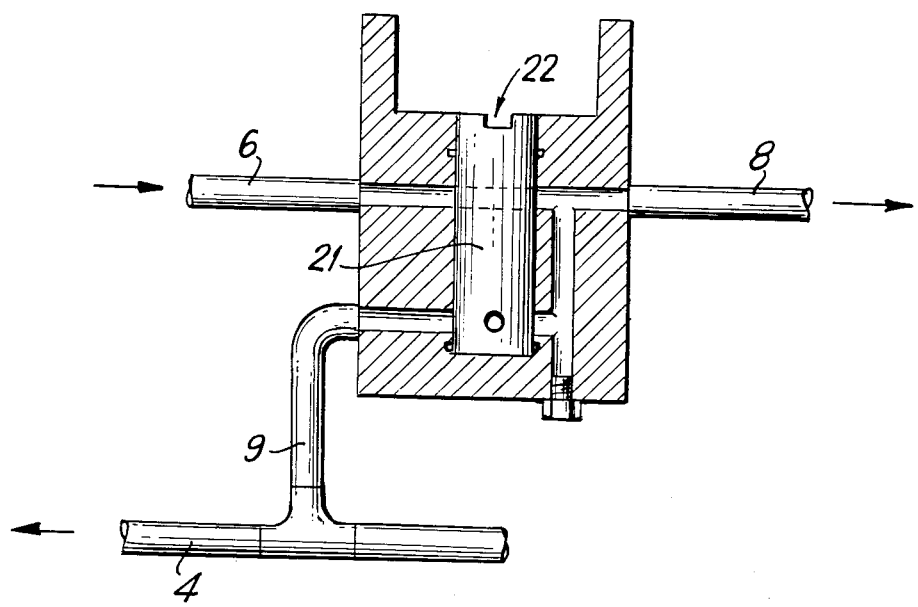

In vehicles which are not equipped with an hydraulic steering mechanism or in case where it is not possible for any reason to install said valve, it is within the scope of the invention to divide the valve into two parts each part of one system, namely, one for the steering mechanism while the second for the braking system as can be seen in FIGS. 3 and 4 which illustrates the new valve in a separate condition—in such cases two separate keys may be used.

Figure 5:
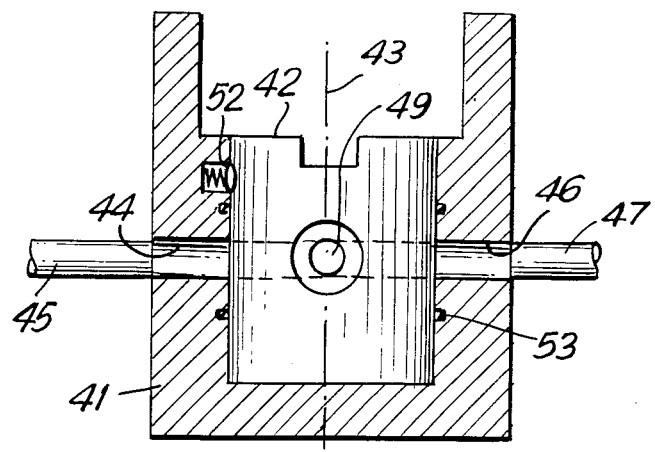
FIGS. 5, 6 and 7 illustrate a further embodiment of the valve.
Figure 6:
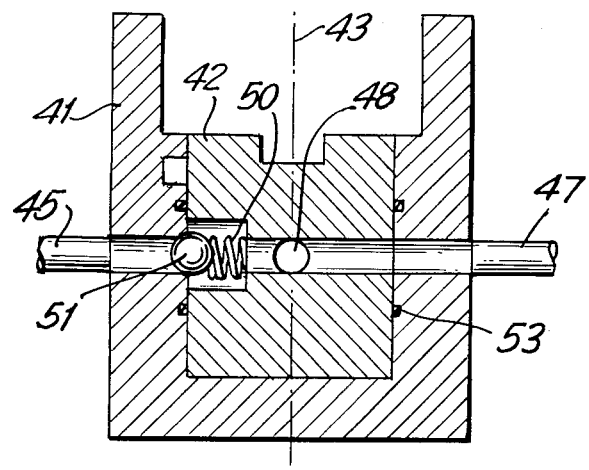
Figure 7:
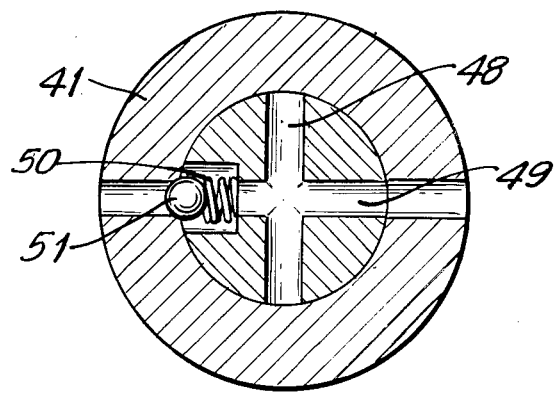

FIGS. 5, 6 and 7 illustrate a further embodiment of the new valve which consists of a housing 41 and an inner core member 42 which can be turned about axis 43, said housing is provided with inlet (and outlet) port 4 to which conduit 45 is connected, outlet (and inlet) port 46 to which conduit 47 is connected. Core member 42 is provided with bores 48 and 49. Bore 49 has a greater diameter at one end thereof, into which are placed a spring 50 and ball 51. The inner member 42 further comprises a ball and dent 52 which secures the core in its position. "O" ring seals 53 are provided around core 42 to provide tightness.

The valve operates in the following manner. The hydraulic fluid normally passes through bore 48 to both directions, thus when pressure is applied the fluid is free to flow from left to right and back into the fluid tank.

In order to lock the system, core 42 is turned through 90° (by means of a key or the like). As can be seen in FIG. 6, when pressure is applied, the fluid passes through bore 49 while pressing ball 51 against spring 50. It is easy to understand that the flow back is not possible as ball 51 blocks the passage, thus the system remains in a locked position practically immobilizing the system. The system may be realised by turning core 42 into it normal or unlocked position.

The described embodiment of the valve are shown by way of example, the core in the present case is turned through 90° by a key, likewise it can be operated linearly as well.

I claim:

1. A system for installation in mechanized vehicles with an hydraulic brake system for preventing unauthorized operation of such vehicles including a valve of a special construction which comprises a housing with at least two inlet ports and two outlet ports for hydraulic fluid and an inner core member which is movable within the housing between a locked position and an unlocked position and is provided with bores arranged to correspond with said ports in said housing forming a passage, hydraulic fluid pipes connected to said ports for flowing hydraulic fluid through said bores in said inner core member, said valve further comprises at least one by-pass passage provided with a one way valve connected to one of said bores for bypassing hydraulic fluid through said inner core member from passage between said ports when said inner core member is in the locked position, said inner core member further comprises an extension provided with two said bores perpendicular to each other, and said inner core member arranged to be connected to a key operated lock.

2. The system claimed in claim 1, characterised thereby that the said inner core is movable rotatively within the said housing.

3. The system claimed in claim 1, characterised thereby that the said inner core is movable axially within the said housing.

4. The system claimed in any one of claims 1 or 2 or 3, characterised in that the said movable inner core is movable by a key.

5. The system claimed in claim 1, characterised thereby that the said inner core member is divided into two distinct parts, each of which is movable separately.

6. The system claimed in claim 5, characterised thereby that each said district part of the inner core is movable by a different key.

7. The system as claimed in claim 5 characterized thereby that one said distinct part of the inner core is provided with at least two crossing bores registerable with said ports in the housing connected to said hydraulic fluid pipes, at least one of said bores within said inner core is provided with a spring urged ball forming one way passage within said bore and blocking flow out of said bore.

8. The system as claimed in claim 5 characterized thereby that the housing and inner core member comprises a ball and dent for securing said inner core member in position in said housing.

* * * * *